D. A. & J. E. PHILLIPS & A. D. GABLE.
NUT LOCK.
APPLICATION FILED NOV. 6, 1911.
1,174,896.
Patented Mar. 7, 1916.
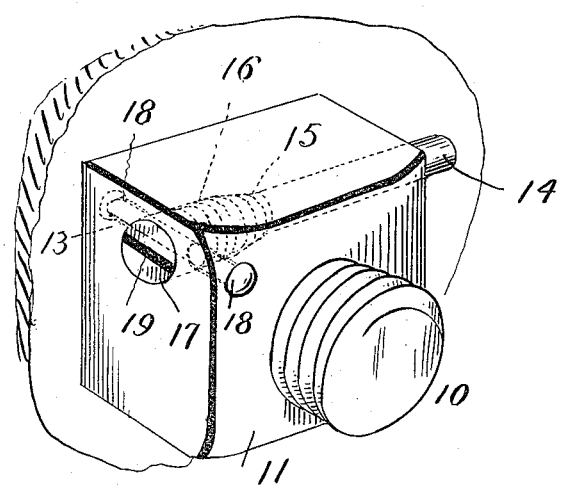
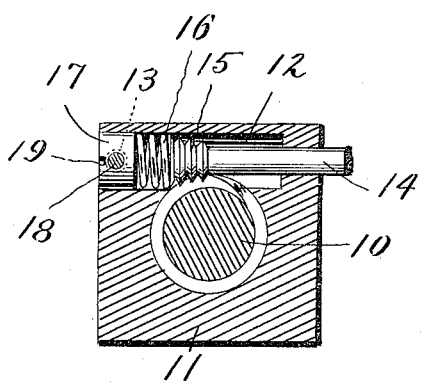
WITNESSES
INVENTORS
David A. Phillips,
John E. Phillips,
Augustus D. Gable,
By Attorney

UNITED STATES PATENT OFFICE.

DAVID A. PHILLIPS, JOHN E. PHILLIPS, AND AUGUSTUS D. GABLE, OF SHENANDOAH, PENNSYLVANIA.

NUT-LOCK.

1,174,896.   Specification of Letters Patent.   Patented Mar. 7, 1916.

Application filed November 6, 1911. Serial No. 658,720.

*To all whom it may concern:*

Be it known that we, DAVID A. PHILLIPS, JOHN E. PHILLIPS, and AUGUSTUS D. GABLE, of Shenandoah, in the county of Schuylkill, and in the State of Pennsylvania, have invented a certain new and useful Improvement in Nut-Locks, and do hereby declare that the following is a full, clear, and exact description thereof.

The object of our invention is to provide a nut lock, which, while simple and inexpensive in construction, will infallibly hold the nut or bolt from accidental or unintentional loosening and yet permit the nut or the bolt readily to be unscrewed should there be occasion therefor, and to this end our invention consists in the lock constructed substantially as hereinafter specified and claimed.

In the accompanying drawings, Figure 1 is a perspective view of a nut and bolt lock embodying our invention; and Fig. 2 a section transversely of the nut and bolt.

The bolt 10 and nut 11 are of ordinary construction, excepting that in the nut there are two holes or passages, one 12, which extends tangentially of the bolt hole and at its side next to the bolt cuts into the bolt hole, and the other hole 13 extends across the hole 12 parallel with the bolt hole axis, and near one end of the hole 12. In the tangentially extending hole 12 is a slidable tangentially extending pin 14, having within the opening 12 a serrated head or enlargement 15 that is tapering in form and the serration being in the form of a screw thread, or similar thereto, with sharp edges so that they will engage and bite into the periphery of the bolt thread, the bite being increased by any unscrewing tendency of either bolt or nut, and thus bolt and nut being rigidly held from any unintentional or accidental unscrewing motion. The opposite end of the pin 14 protrudes through a reduced portion of the hole 12 to the outside of the nut where it may be engaged by the finger or a suitable tool to move inwardly longitudinally and thus free the bolt thread from engagement by the head 15 under which conditions the nut and bolt may be unscrewed. The pin 14 is normally and yieldingly pressed into bolt-engaging and locking position by means of a coil spring 16 seated between the head 15 and a filling plug 17 inserted in the outer end of the hole 12, and passing diametrically through the plug 17, which is round, is a locking pin 18, which also passes through the hole 13, and the ends of said pin 18 are riveted or headed down and thus accidental removal of the locking pin 18 is prevented. To facilitate the assemblage of parts, the outer end of the plug 17 has a diametrically extending groove 19 which is parallel with the hole in the head through which the pin 18 passes, so that by placing the plug 17 with its groove 19 parallel with the hole 13, the alinement of the hole 13 in the nut and the hole in the plug 17 will be assured so that the pin 18 may be easily and quickly put in place.

It will be evident that our nut and bolt lock fulfils all the conditions required in a thoroughly practical and efficient lock.

Having thus described our invention what we claim is—

An improvement in nut and bolt locks, the combination of a nut, a longitudinally slidable pin arranged tangentially of the bolt hole in the nut having an integral inclined bolt-engaging head whose diameter is greater than the space between adjacent threads in a chamber in the nut and the pin end opposite said head being accessible from out side of the nut to move it to release the bolt, the inclined portion of the head being provided with a series of sharp edges, a spring engaging said head, an abutment block engaged by said spring and closing the outer end of the chamber, and means for permanently attaching said block to the nut.

In testimony that we claim the foregoing we have hereunto set our hands.

DAVID A. PHILLIPS.
JOHN E. PHILLIPS.
AUGUSTUS D. GABLE.

Witnesses:
JOHN SMITH,
J. M. FETZ.

Copies of this patent may be obtained for five cents each, by addressing the "Commissioner of Patents, Washington, D. C."